United States Patent
Anderson et al.

[11] Patent Number: 6,138,782
[45] Date of Patent: Oct. 31, 2000

[54] STEERING RESPONSIVE POWER BOOST

[75] Inventors: Lawrence Vernon Anderson, Cedar Falls; John Wayne Schletzbaum, Hudson; Ronald Lee Mayfield, Cedar Falls; Dennis Royal Yoder, Grundy Center; Benjamin Michael Witte, Fairbank; Raymond Yifei Hou; Sanjay Ishvarlal Mistry, both of Waterloo, all of Iowa

[73] Assignee: Deere & Company, Moline, Ill.

[21] Appl. No.: 09/257,717

[22] Filed: Feb. 25, 1999

[51] Int. Cl.$^7$ ..................................................... B62D 11/04
[52] U.S. Cl. .............................. 180/6.44; 180/6.7; 701/41
[58] Field of Search .................................... 180/6.2, 6.44, 180/6.48, 6.5, 6.66, 6.7; 701/99, 101, 102, 41, 42

[56] References Cited

U.S. PATENT DOCUMENTS 4,309,917  1/1982  Leet .
4,519,275  5/1985  Maruyama et al. .
4,699,021  10/1987  Waddington .
5,921,335  7/1999  Straetker ................................. 180/6.44

FOREIGN PATENT DOCUMENTS 2 221 518  7/1990  European Pat. Off. .

*Primary Examiner*—Kevin Hurley

[57] ABSTRACT

A steering control system for a tracked vehicle includes an engine driven variable displacement steering pump which drives a hydraulic motor. A control system senses steering wheel position, vehicle speed, engine speed and forward/reverse vehicle direction. As a function of these sensed inputs, a control signal is generated and is used to control the swashplate angle of an engine-driven variable displacement pump which drives a steering motor which drives a differential track drive mechanism. The control system also determines a ratio of motor speed to vehicle speed and generates a powerboost signal when the ratio exceeds a threshold value. The powerboost signal is communicated to the engine controller which causes the engine to increase its power output. This modifies the engine fuel delivery curve based on the steering system power requirement and increases the power available for turning the vehicle.

6 Claims, 2 Drawing Sheets

STEERING RESPONSIVE POWER BOOST

BACKGROUND OF THE INVENTION

The invention relates to a control system for a tracked vehicle.

Tracked vehicles are steered by driving one track faster or slower than the other and significant power is required for such vehicles to turn. U.S. Pat. No. 4,699,021 issued Oct. 13, 1987 to Waddington, describes an integrated power system for a tracked vehicle driven by a gas turbine, wherein fuel flow to the gas turbine engine is increased when a directional control is placed in a pivot steering or counter-rotation position. However, This system does not increase engine power during normal turning operation (non-counter-rotation steering). But, when a tracked vehicle turns under heavy load, the steering system uses up most of the engine power. For example, if a tracked vehicle is pulling an implement, then, unless engine power output is increased, during a turn there will be less power available to operate the implement. Under such a condition, the operator has to compromise with respect to either vehicle speed or implement depth while turning. Adjusting the implement so that adequate power remains for turning would result in wasted unused power during more prevalent straight ahead operation. Failing to provide adequate power for turning may result in lifting the implement during turns, changing the gear ratio or overloading the engine.

SUMMARY OF THE INVENTION

Accordingly, an object of this invention is to provide a tracked vehicle control system which increases engine power output during turning operation relative to the engine power during straight ahead operation.

This and other objects are achieved by the present invention, wherein a tracked vehicle includes an engine controlled by an electronic engine controller. A control system senses steering wheel position, vehicle speed, engine speed and forward/reverse vehicle direction. As a function of these sensed inputs, a control signal is generated and is used to control the swashplate angle of an engine-driven variable displacement pump which drives a steering motor which drives a differential track drive mechanism. According to the present invention, the control system also determines a ratio of motor speed to vehicle speed and generates a powerboost signal when the ratio exceeds a threshold value. The powerboost signal is communicated to the engine controller which causes the engine to increase its power output. This modifies the engine fuel delivery curve based on the steering system power requirement. This allows increased power to be automatically available for turning the vehicle, thus increasing productivity and reducing the number of required additional operating controls while turning.

DETAILED DESCRIPTION

Figure 1:
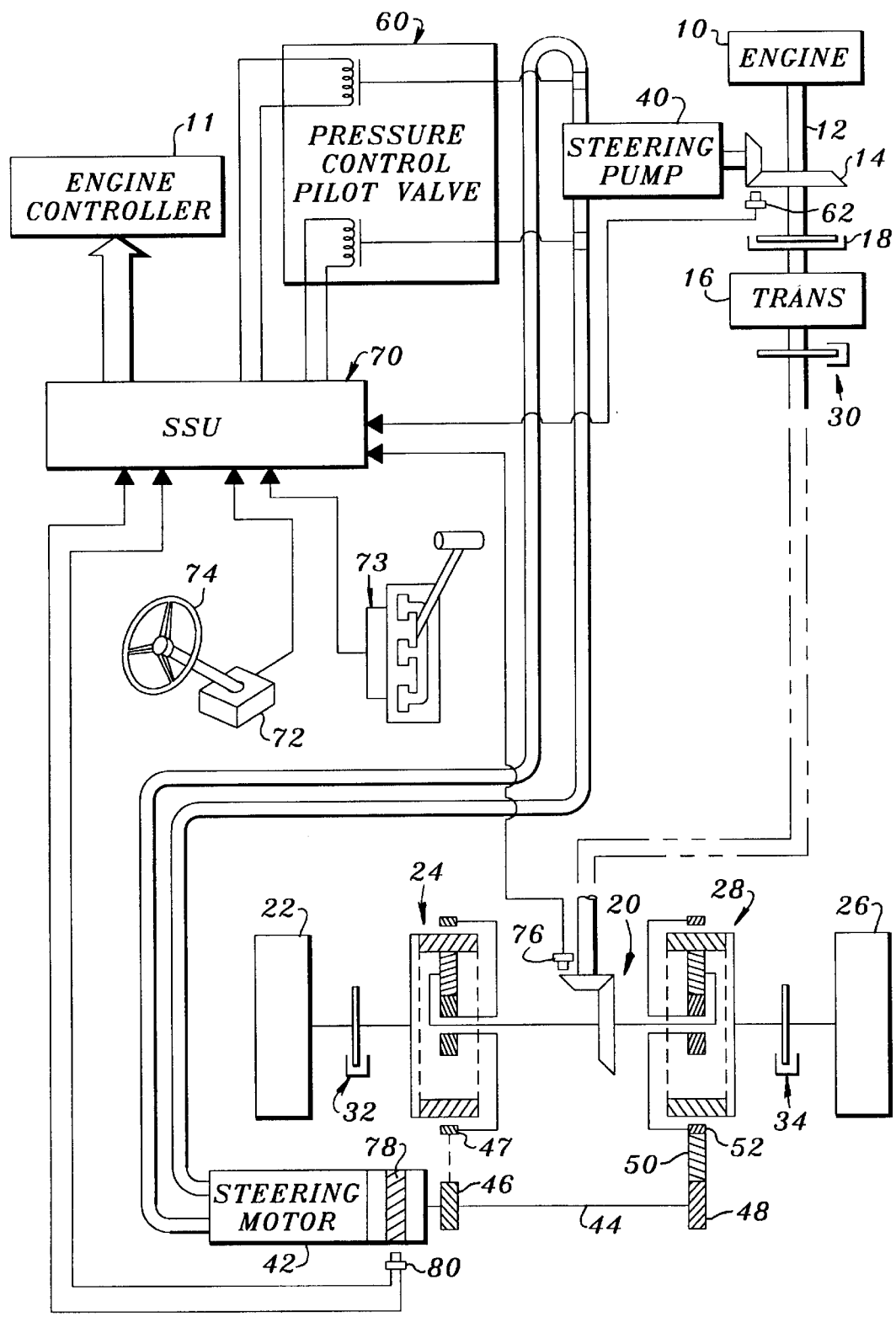
FIG. 1 is a simplified schematic diagram of a tracked vehicle drive and the control system of the present invention.

Referring to FIG. 1, an engine 10 of a tracked vehicle has an output shaft 12 which drives a right angle gear 14 and a transmission 16 via a clutch 18. The engine 10 is controlled by an electronic engine control unit 11. The transmission 16 drives a final or right angle drive 20, which drives a left track drive wheel 22 via left steering planetary drive 24, and a right track drive wheel 26 via right steering planetary drive 28. The steering planetary drives 24 and 28 are preferably such as described in U.S. Pat. No. 5,390,751, issued Feb. 21, 1995 to Puetz et al., and assigned to the assignee of this application. Additional outboard planetaries (not shown), as provided on John Deere 8000 tractors, are mounted between the steering planetaries and the respective drive wheels, but are not further described because they are not directly involved in the steering responsive power boost function which is the subject matter of this application. A parking brake 30 is coupled to shaft 18, and left and right service brakes 32, 34 are coupled to the left and right drive wheels 22, 26, respectively.

The right angle gear 14 drives a variable displacement steering pump 40, such as a 75 cc, 90 series pump made by Sauer-Sundstrand. The pump 40, in turn, powers a hydraulic fixed displacement steering motor 42, such as a 75 cc, 90 series motor, also made by Sauer-Sundstrand. The steering motor 42 drives, via a cross shaft 44 and gear 46, a ring gear 47 of left planetary drive 24, and via cross shaft 44, gear 48 and reverser gear 50, a ring gear 52 of right planetary drive 24.

The swashplate (not shown) of steering pump 40 is controlled by a pressure controlled pilot valve or electronic displacement control (EDC) 60. The EDC is preferably a known two stage device with first stage including a flapper type valve and a second stage including a boost stage to the pump, such as is commercially available from Sauer Sundstrand with minor modifications to the spool for cold weather and without a manual override function.

A rotation speed sensor 62, such as a commercially available mag pickup, mounted in proximity to the right angle drive 14, provides an engine speed signal to a steering system unit (SSU) 70. The solenoids of valve 60 are controlled by pump command signals (pump_cmd) signals generated by SSU 70. The SSU 70 is communicated with the engine control unit 11.

A steering wheel rotary position transducer 72, such as a rotary potentiometer, provides to SSU 70 a steering angle signal (steer_angle) representing the position, relative to a centered position, of a spring centered, operator controlled steering wheel 74.

A drive line rotation speed sensor 76, preferably a differential Hall-effect speed sensor such as used on production John Deere tractors, is mounted in proximity to the final drive 20, and provides to the SSU 70 a final drive speed, wheel or vehicle speed signal. A magnetic ring 78 is mounted for rotation with the motor 42, and a Hall-effect transducer 80 mounted near the magnetic ring 78 provides to the SSU 70 a motor speed signal and a motor direction signal.

Figure 2:
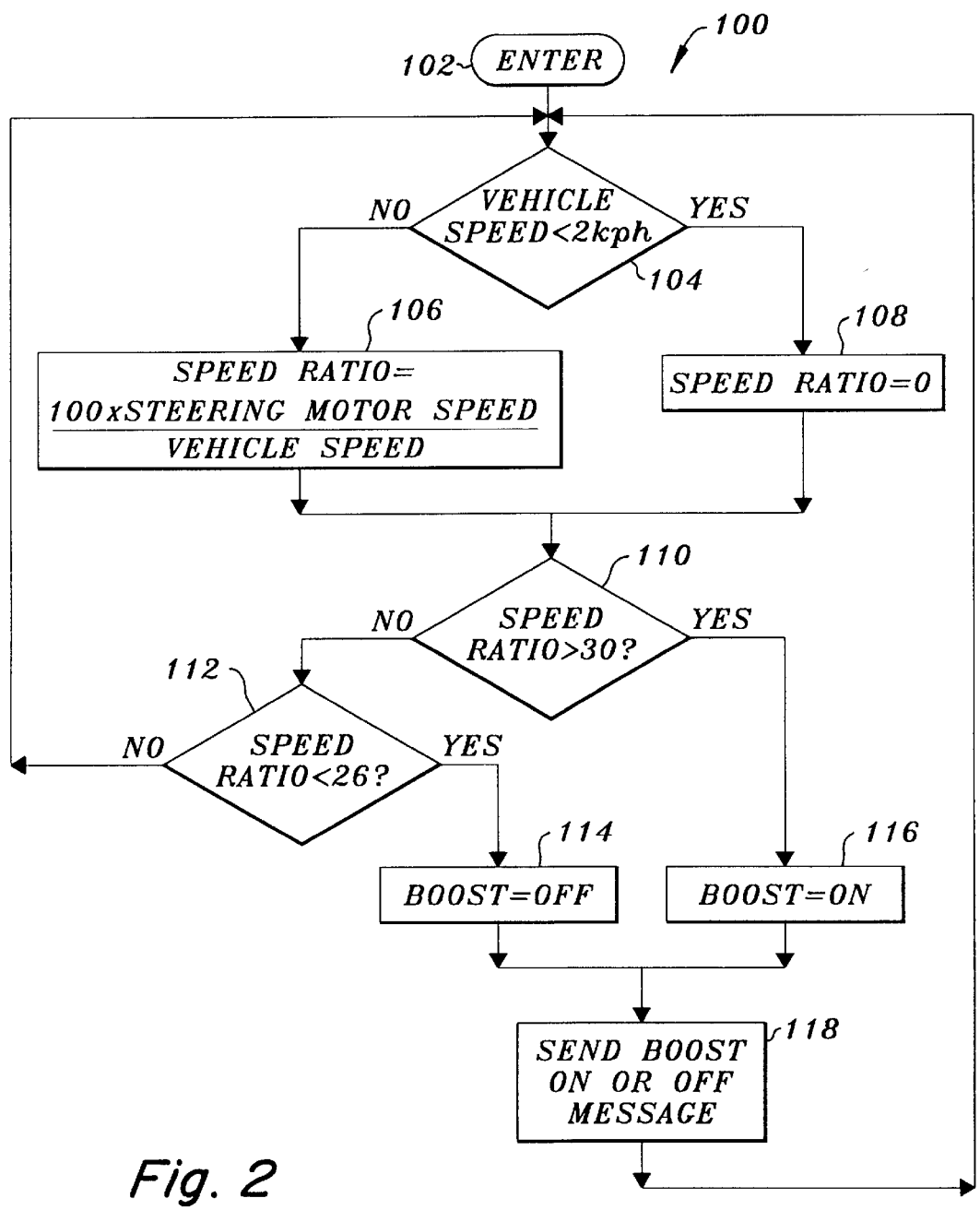
FIG. 2 is a logic flow diagram of a power boost algorithm executed by a microprocessor of the control system of FIG. 1.

The SSU 70 includes a commercially available microprocessor (not shown) which executes a power boost algorithm 100 which is illustrated by FIG. 2. The power boost algorithm 100 begins at step 102. Step 104 checks sensor 76 to determine if the vehicle speed is near zero or less than a small threshold speed, such as 2 kilometers per hour (kph). If it is, step 108 sets a speed ratio value to zero and directs the algorithm to step 110. If in step 104 the vehicle speed is not near zero, the algorithm proceeds to step 106. Step 106 calculates a speed ratio value equal to a constant (100) times the steering motor speed (from sensor 80) divided by the vehicle speed.

After either steps 106 or 108, step 110 compares the speed ratio value to a first threshold or setpoint value, such as 30. If the speed ratio is greater than the setpoint value, the algorithm proceeds to step 116 which sets a boost flag to ON. If the speed ratio in step 110 is not greater than the setpoint value, the algorithm proceeds to step 112 which compares the speed ratio to a second setpoint or threshold value, such as 26. If the speed ratio in step 112 is not greater than the second setpoint value, the algorithm returns to step 104. If the speed ratio in step 112 is greater than the second setpoint value, the algorithm proceeds to step 114 which sets the boost flag to OFF.

Step 118 then sends to the engine control unit 11 the appropriate boost ON or boost OFF signal as set in step 114 or 116 so that the engine control unit 11 will increase or not increase the power output of the engine 10 accordingly, and then returns control to step 104. Thus, the algorithm 100 operates to increase the power output of the engine 10 when the vehicle is in a turn and when the ratio of steering motor speed to vehicle speed exceeds a certain threshold level. If this threshold level is exceeded, this increased engine power output will be maintained until the ratio drops below a second lower threshold.

If the vehicle is in a purely counter-rotation or pivot steering mode, then the vehicle speed (sensed by sensor 76) will be near zero or less than a small threshold speed, such as 2 kph, and steps 104, 108, 110, 112 and 114 will operate to generate a power boost OFF signal and there will be no engine power boost due solely to this algorithm. It should be understood that the engine controller 11 will perform its normal function and provide sufficient fuel to the engine 10 so that the engine 10 can provide the power necessary for the counter-rotation of the drive wheels 22 and 26. However, the present invention will operate so that, during pure counter-rotation turning, there will be no extra engine power boost beyond that which is normally provided by the engine controller 11.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A control system for a tracked vehicle having left and right tracks, an engine controlled by an electronic engine controller, the engine driving a differential track drive mechanism which turns the vehicle by driving the left and right tracks at different speeds, the control system comprising:

means for generating a powerboost ON signal when the vehicle is turning in a noncounter-rotational mode;

means for generating a powerboost OFF signal when the vehicle is not turning;

means for communicating the powerboost ON and powerboost OFF signals to the electronic engine controller, the engine controller increasing a power output of the engine above a normal power level in response to the powerboost ON signal, and the engine controller decreasing a power output of the engine back to its normal level in response to the powerboost OFF signal.

2. The control system of claim 1, wherein:

the engine of the tracked vehicle drives a variable displacement pump which drives a steering motor which drives the differential track drive mechanism, and the control system comprises:

a motor speed sensor for generating a motor speed signal representing a speed of the steering motor;

a vehicle speed sensor for generating a vehicle speed signal;

means for calculating a speed ratio representing a ratio of motor speed to vehicle speed;

means for comparing the speed ratio to a threshold value; and means for generating the powerboost ON signal if the speed ratio is greater than the threshold value.

3. The control system of claim 2, comprising:

means for generating the powerboost OFF signal if the speed ratio is less than a second threshold value.

4. The control system of claim 1, comprising:

means for generating of the powerboost OFF signal when the differential track drive mechanism is operating substantially in a purely counter-rotation mode.

5. The control system of claim 2, comprising:

means for generating the powerboost OFF signal if the vehicle speed signal is near zero.

6. A control system for a tracked vehicle having left and right tracks, an engine controlled by an electronic engine controller, the engine driving a variable displacement pump which drives a steering motor which drives a differential track drive mechanism which turns the vehicle by driving the left and right tracks at different speeds, the control system comprising:

a motor speed sensor for generating a motor speed signal representing a speed of the steering motor;

a vehicle speed sensor for generating a vehicle speed signal;

means for calculating a speed ratio representing a ratio of motor speed to vehicle speed;

means for comparing the speed ratio to a first threshold value;

means for generating a powerboost ON signal if the speed ratio is greater than the threshold value;

means for comparing the speed ratio to a second threshold value if the speed ratio is not greater than the threshold value; and means for generating a powerboost OFF signal if the speed ratio is less than the second threshold value, the engine controller increasing a power output of the engine in response to the powerboost ON signal, and the engine controller causing the engine to produce a normal power output of the engine in response to the powerboost OFF signal.

* * * * *